_US010927317B2_

United States Patent
Sitzmann

(10) Patent No.: US 10,927,317 B2
(45) Date of Patent: Feb. 23, 2021

(54) SYSTEM AND PROCESS FOR PRODUCING BIOMASS PELLETS

(71) Applicant: Amandus Kahl GmbH & Co. KG, Reinbek (DE)

(72) Inventor: Werner Sitzmann, Hamburg (DE)

(73) Assignee: Amandus Kahl GmbH & Co. KG, Reinbek (DE)

( * ) Notice: Subject to any disclaimer, the term of this patent is extended or adjusted under 35 U.S.C. 154(b) by 91 days.

(21) Appl. No.: 16/261,923

(22) Filed: Jan. 30, 2019

(65) Prior Publication Data

US 2019/0233752 A1     Aug. 1, 2019

(30) Foreign Application Priority Data

Jan. 30, 2018   (EP) .................................... 18154018

(51) Int. Cl.
| | | |
|---|---|---|
| *C10L 5/44* | (2006.01) | |
| *C10L 5/06* | (2006.01) | |
| *C10L 9/06* | (2006.01) | |
| *C10L 5/36* | (2006.01) | |

(52) U.S. Cl.
CPC .................. *C10L 5/442* (2013.01); *C10L 5/06* (2013.01); *C10L 5/363* (2013.01); *C10L 9/06* (2013.01); *C10L 2200/0469* (2013.01); *C10L 2290/06* (2013.01); *C10L 2290/08* (2013.01); *C10L 2290/141* (2013.01); *C10L 2290/18* (2013.01); *C10L 2290/24* (2013.01); *C10L 2290/28* (2013.01); *C10L 2290/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,623,515 A | * | 11/1986 | Frei ........................... | B07B 9/00 422/1 |
| 2004/0040469 A1 | * | 3/2004 | McAulay .............. | C04B 18/028 106/453 |
| 2017/0246759 A1 | | 8/2017 | Hopke et al. | |

FOREIGN PATENT DOCUMENTS

| | | |
|---|---|---|
| EP | 1783195 A2 | 5/2007 |
| EP | 2765178 A1 | 8/2014 |
| WO | 2016163877 A1 | 10/2016 |
| WO | WO-2016163877 A1 * 10/2016 | .............. C10L 5/442 |

OTHER PUBLICATIONS

European Search Report dated Jun. 8, 2018 for European Patent Application No. 18154018.8.

* cited by examiner

*Primary Examiner* — Ellen M McAvoy
*Assistant Examiner* — Chantel L Graham
(74) *Attorney, Agent, or Firm* — Alix, Yale & Ristas, LLP

(57) ABSTRACT

A system for producing biomass pellets comprising a pan mill for comminuting a biomass material, a treatment means in which the comminuted biomass material is treated with an oxidizing reactant and a pellet press for pressing pellets from the treated biomass material. The invention further relates to an associated process. The intention is to initiate during pellet production oxidation reactions which can otherwise result in autoignition of the pellets in pellet heaps.

17 Claims, 3 Drawing Sheets

SYSTEM AND PROCESS FOR PRODUCING BIOMASS PELLETS

BACKGROUND

The invention relates to a system and a process for producing biomass pellets.

Biomass pellets, in particular wood pellets, are today widely used as fuels since this can reduce the consumption of fossil fuels. While the use of biomass pellets was initially limited primarily to domestic combustion appliances biomass pellets are today increasingly burned in power plants to produce electricity. Power plants may be configured for the sole use of biomass pellets. It is also possible to add biomass pellets to the fossil fuel in conventional power plants (co-firing).

The amount of biomass pellets to be stored and to be transported has steadily increased in the course of this development. Thus for example large amounts of wood pellets produced in the USA and in Canada are employed in European power plants. The pellets are transported across the Atlantic in large-scale containers on ships.

When pellets are transported, stored or handled in large amounts this can lead to autoignition of the pellets which can consequently result in considerable fire damage. It is presumed that autoignition is caused by oxidation reactions inside the pellets in the course of which heat is liberated. Autoheating can cause formation in the pellet heaps of hotspots in which the ignition temperature of the pellets is exceeded.

SUMMARY OF THE INVENTION

The invention has for its object to provide a process and a system with which biomass pellets are producible with a reduced autoignition risk. Starting from the recited prior art the object is achieved with the features of the independent claims. Advantageous embodiments are specified in the subsidiary claims.

The system according to the invention comprises a pan mill for comminuting a biomass material, a treatment means with which the comminuted biomass material is treated with an oxidizing reactant and a pellet press for pressing pellets from the treated biomass material.

The invention is based on the idea of deliberately allowing certain oxidation reactions to take place even before pressing of the pellets so that these reactions can no longer bring about unwanted heating in a later pellet heap.

The invention proposes using a pan mill for comminuting the biomass material. The invention has recognized that the pan mill converts the biomass material into a state in which a treatment with an oxidizing reactant is particularly effective.

The use of a pan mill distinguishes the system according to the invention from the hitherto customary systems in which a hammer mill is used for comminuting the biomass material. In the case of a hammer mill a hammer element is used to impact large pieces of the biomass material in order to divide the biomass material into smaller pieces. The hammer impacts form intrinsically compact fragments in the form of shavings.

By contrast, in the case of a pan mill pan rollers roll along a track of a perforated die. The coarse pieces of the biomass material are processed between the pan rollers and the perforated die and as smaller pieces in a predominantly fibrous state pass through the openings of the perforated die. In a pan mill the comminuting action results to a substantial extent from shear forces which act on the biomass material between the pan rollers and the perforated die. Under the influence of the shear forces the biomass material is broken down into smaller pieces having a predominantly fibrous structure. On account of the predominantly fibrous structure the pieces have a surface area which is large relative to their mass, thus rendering them particularly receptive to a reaction with an oxidizing reactant.

The perforated die of the pan mill may be a flat die over which the pan rollers roll in a plane. The holes of the flat die may be aligned parallel to one another. In operation of the pan mill the holes may extend in the vertical direction. Arranged on the flat die may be a track for the pan rollers which may extend in a circle around a central axis of the flat die. The pan mill may comprise a driveshaft which may be aligned along the central axis of the flat die. The axis of rotation of the pan roller may be aligned perpendicularly to the driveshaft. The pan rollers may be cylindrical. The pan mill may have a plurality of pan rollers which may in particular be uniformly distributed around the circumference of the driveshaft.

In such a pan mill radially outer sections of the pan rollers have a greater track speed relative to the perforated die than radially inner sections of the pan rollers. The different relative speeds over the width of the pan result in very strong shear forces which bring about the desired predominantly fibrous structure of the comminuted pieces of the biomass material.

The predominantly fibrous structure of the comminuted biomass material allows a particularly intensive interaction with the oxidizing reactant. Without wishing to be bound to a particular theory it is thought autoignition of pellets is brought about by particular autoxidation reactions inside the pellets. If such reactions taking place in uncontrolled fashion in the inside of a pellet heap can at least partially take place during the process for producing pellets, this reduces the likelihood of autoignition of the finished pellets during subsequent storage or subsequent transport.

The comminuted biomass material may be contacted with the oxidizing reactant in a liquid state. For example the oxidizing reactant may be spray-applied onto the biomass material. One example of an oxidizing reactant in liquid form is hydrogen peroxide. The hydrogen peroxide may be diluted, for example in water, and the proportion of hydrogen peroxide in the solution may be between 20% and 50% for example. The amount of the solution supplied may be between 0.5% by weight and 2% by weight for example, based on the weight of the biomass pellets.

It is also possible to contact the comminuted biomass material with the oxidizing reactant in a gaseous state. For example the comminuted biomass material may have a gas stream directed onto it which comprises a substream of ionized atmosphere or which consists entirely of ionized atmosphere. The ionized atmosphere may comprise or consist of ozone for example, in particular short-lived ozone.

If one of the comminution steps is performed in a hammer mill the gaseous oxidizing reactant may be supplied to the solid shortly after the biomass material has left the hammer mill. This is possible in particular when, as is often customary in hammer mills, the material is discharged from the hammer mill by pneumatic means (aspiration). The gas stream from the hammer mill with which the material is set into motion may be provided with the oxidizing reactant.

The treatment means may be configured as a storage apparatus or as a transport apparatus for the comminuted biomass material. This may be a separate storage/transport means with which the system according to the invention is specifically provided for the purposes of treatment with the oxidizing reactant. It is also possible to carry out the treatment in a storage/transport means that is in any case present in a system for producing pellets. In this case a means in which the comminuted biomass material is dried may be concerned for example.

If the oxidizing reactant is added in liquid form the reactant may be contacted with the comminuted biomass material by spray application. The treatment means may comprise a spray apparatus configured for this purpose. If the comminuted biomass material is contacted with the oxidizing reactant in a gaseous state the system may comprise a nozzle or an opening through which the particular gas stream may be directed onto the biomass material.

In one embodiment the system comprises a transport means for the comminuted biomass material in the form of a pneumatic conveying means. The pneumatic conveying means may comprise a tube in which as the conveying stream a high-speed gas stream is generated which entrains the biomass material. The oxidizing reactant may be added to the conveying stream as a substream.

In the context of the invention the term biomass pellets is to be understood as meaning that the starting material from which the pellets are pressed is predominantly biomass. It is not inconceivable that other substances, for instance wastes, have been admixed with the starting material. The proportion of these other substances should be less than 30%. After the pressing operation the pellets have a higher density than the starting material. The term biomass comprises for example all renewable straw- and wood-like materials and mixtures thereof. Wood and/or straw in particular are used as raw materials. It is preferable when the biomass comprises wood as a raw material, in particular comprises at least 50% wood. The pellets may consist entirely of biomass.

The process may be performed such that the biomass material is coarsely comminuted before it is supplied to the system according to the invention as starting material. For example the biomass starting material may have been passed through a chipper so that as the starting material for the system according to the invention it is in the form of coarse chips.

In the process according to the invention one or more comminution steps may be performed. In one embodiment the starting material is comminuted down to a shaving-like size in a first comminution step. In a second comminution step the shaving-like constituents of the biomass material may be comminuted further. Following the second comminution step the biomass material may be supplied to a pellet press.

The system according to the invention may be configured such that each comminution step is performed with a pan mill. Each of the pan mills may have the recited features of a pan mill. It is also possible to configure the system according to the invention such that some of the comminution steps are performed with a pan mill and some of the comminution steps are performed with another type of apparatus. For example the system according to the invention may comprise a pan mill for one of the comminution steps and a hammer mill for another of the comminution steps.

The starting material may have a moisture content of 40% to 50% by weight for example. The first comminution step may be performed when the biomass material has a moisture content of this order of magnitude. The first comminution may be followed by a drying step with which the moisture content is reduced to 10% to 15% by weight for example. The system according to the invention may comprise a corresponding dryer arranged downstream of the first comminution apparatus. A second comminution apparatus may be arranged downstream of the dryer.

It has been found that the biomass material achieves a form which is particularly advantageous for the treatment with the oxidizing reactant when the comminution is carried out with the pan mill when the biomass material has a moisture content of at least 20% by weight, preferably of at least 30% by weight. The system according to the invention may therefore be adapted such that the first comminution step is carried out with a pan mill. In particular the biomass starting material may be supplied to the pan mill without preceding drying.

In one embodiment the treatment with the oxidizing reactant is carried out after the drying and before the second comminution step. It has been found that the activity of the oxidizing reactant is better after drying than for the moist starting material. A dryer may therefore be arranged between the pan mill and the treatment means in the system according to the invention.

It is also possible for the treatment with the oxidizing reactant to follow the second communication step. If the treatment means is a pneumatic conveying means the treatment means is preferably arranged downstream of the second comminution step.

After the treatment with the oxidizing reactant and before further processing in the pellet press the biomass material may be stored in an intermediate container in order that there is sufficient time for the oxidation reactions brought about by the oxidizing reactant. Such a storage may for example extend over a period between 0.5 h and 18 h, preferably between 1 h and 12 h. Such a storage may be advantageous in particular when the oxidizing reactant is supplied to the biomass material in liquid form. The system according to the invention may therefore comprise an intermediate container arranged between the treatment means and the pellet press.

The invention also relates to a process for producing biomass pellets in which a biomass material is comminuted with a pan mill, in which the comminuted biomass material is treated with an oxidizing reactant and in which pellets are pressed from the treated biomass material.

The system may be developed with further features described in connection with the process according to the invention. The process may be developed with further features described in connection with the system according to the invention.

BRIEF DESCRIPTION OF THE DRAWINGS

The invention is elucidated hereinbelow by way of advantageous embodiments making reference to the accompanying figures. In the figures.

DETAILED DESCRIPTION

Figure 1:
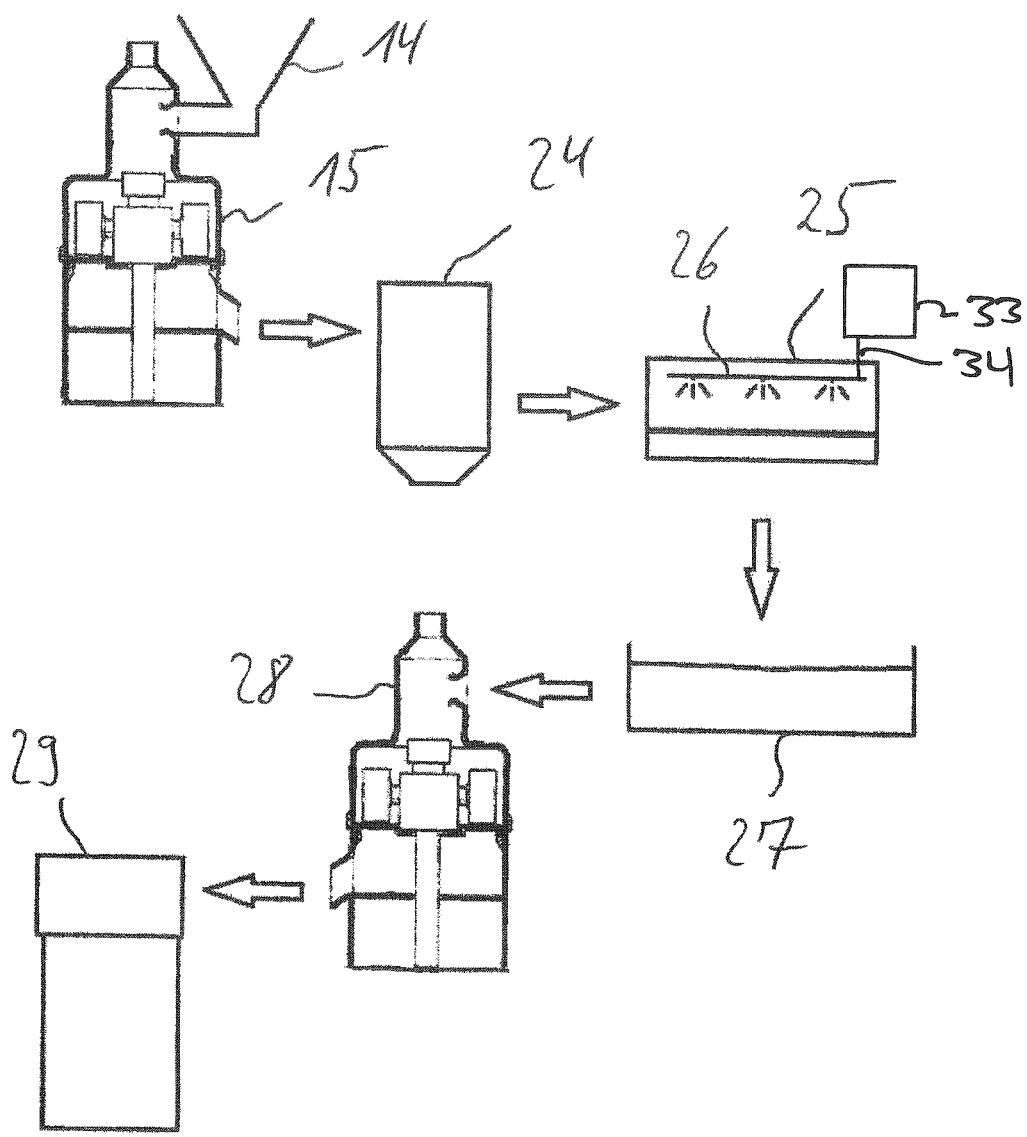
FIG. 1 shows a schematic illustration of a system according to the invention.

Supplied to the system for producing biomass pellets shown in FIG. 1 is a biomass starting material in a coarsely pre-comminuted state in the form of chips. The chips may be predominantly or entirely generated from a wood material.

Figure 2:
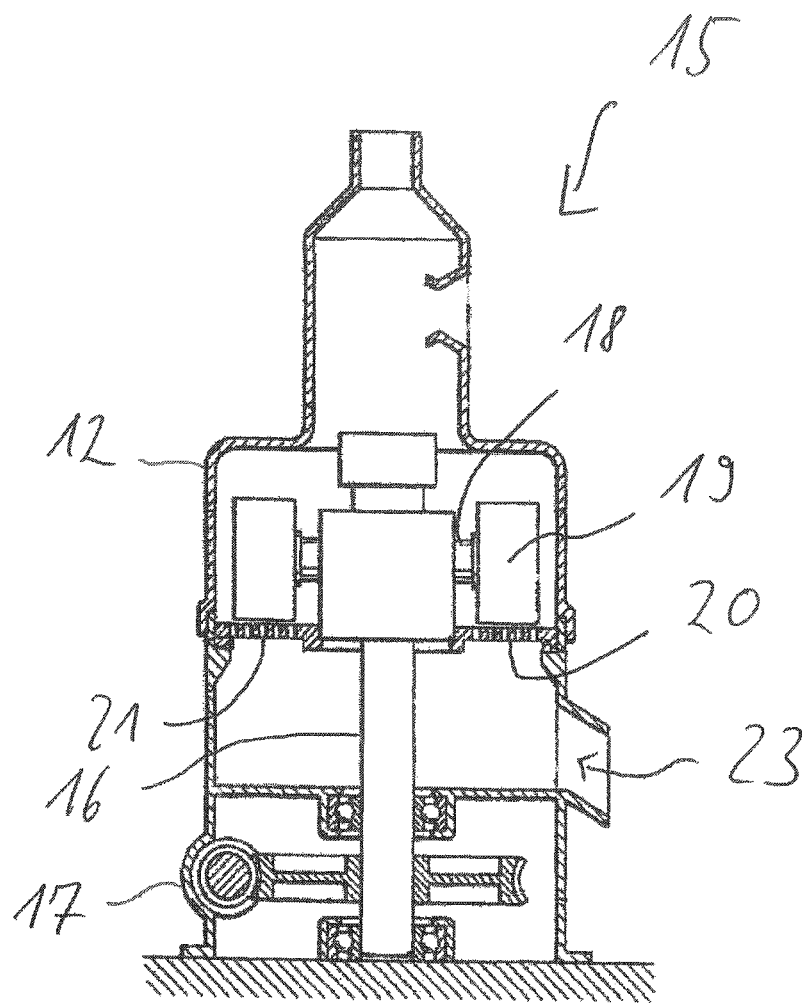
FIG. 2 shows a pan mill of a system according to the invention.

The feeding of the biomass starting material is carried out via a feed hopper 14 of a first pan mill 15. As shown in the enlarged view of the pan mill 15 in FIG. 2 the material falls onto the top side of a perforated die 20 and is there comminuted by compressive and shear forces exerted by the pan rollers 19. The biomass material is converted into the form of predominantly fibrous shavings which pass through the holes 21 in the perforated die 20 as soon as they are sufficiently small. The biomass material can exit the first pan mill 15 via an outlet opening 23.

The construction of the pan mill 15 is as follows: a floorstanding machine housing 12 carries a driveshaft 16 configured as a vertical shaft which is rotatably mounted in the machine housing 14. Via a drivetrain 17 the driveshaft 16 may be set into rotation with a drive motor (not shown). Connected to the driveshaft 16 are horizontal stub axles 18. A pan roller 19 is rotatably mounted on each stub axle 18.

The pan rollers 19 run on the top side of the perforated die 20 which has been provided with a plurality of holes 21. The holes 21 extend from an inlet end facing the pan rollers 19 through the perforated die 20 to an outlet end on the underside of the perforated die 20. When the driveshaft 16 is rotating the pan rollers 19 move along a circular track on the surface of the die 20.

The biomass starting material supplied to the first pan mill 15 may have a moisture content of for example 40% to 50% by weight. The comminution operation in the first pan mill 15 does not substantially alter the moisture content and the moisture content of the predominantly fibrous shavings exiting the first pan mill 15 is therefore of the same order of magnitude.

Arranged downstream of the first pan mill 15 is a dryer 24 with which the moisture content of the biomass material is reduced to 10% to 15% by weight for example. Arranged downstream of the dryer 24 is a treatment means 25 in which the biomass material is treated with an oxidizing reactant.

The treatment means 25 may be configured as an intermediate container in which the biomass material is arranged over a large surface area so that the surface of the biomass material is readily accessible. It is also possible for the means 25 to be a transport means on which the biomass material is for example conveyed on a conveyor belt. The biomass material may be arranged on the conveyor belt such that the surface of the biomass material is readily accessible.

The storage/transport means 25 comprises a reactant supply 33, a reactant channel 34, a spraying apparatus 26 defining orifices from which the biomass material may be sprayed with an oxidizing reactant in liquid form. The oxidizing reactant may for example be hydrogen peroxide diluted with water so that the proportion of hydrogen peroxide and the solution is for example 30%. The amount of solution distributed may be 1% by weight for example, based on the weight of the biomass material. Due to the arrangement of the biomass material over a large surface area the oxidizing reactant can bring about oxidation reactions in the biomass material to substantial extents. These oxidation reactions which already take place during production of the pellets are no longer available to bring about heating in a later pellet heap.

Following the treatment with the oxidizing reactant in the storage/transport means 25 is a rest phase of several hours during which the oxidation reactions initiated by the reactant can take place. In FIG. 1 this is indicated schematically via an intermediate storage means 27.

The biomass material treated in this way is comminuted further in a second pan mill 28. The second pan mill 28 differs from the first pan mill 15 in that the holes 21 in the perforated die 20 have a smaller diameter. The biomass material is broken down into smaller predominantly fibrous constituents before it can pass through the holes 21 of the second pan mill 28.

After the second comminution operation the biomass material may be pressed to afford pellets in a pellet press 29. This may be done using customary pellet presses in which the biomass material is for example pressed through a ring die or a flat die. There are pellet presses having a certain similarity to the pan mills 15, 28 in terms of their construction. These pellet presses differ from the pan mills 15, 28 in that the pass-through channels in the flat die have a markedly greater length than the holes 21 in the perforated die 20. After sufficient comminution the biomass material can pass through the holes 21 in the perforated die 20 without being compressed further. In the pellet press the friction against the channel walls is sufficiently great for the material to be compressed to afford pellets.

Figure 3:
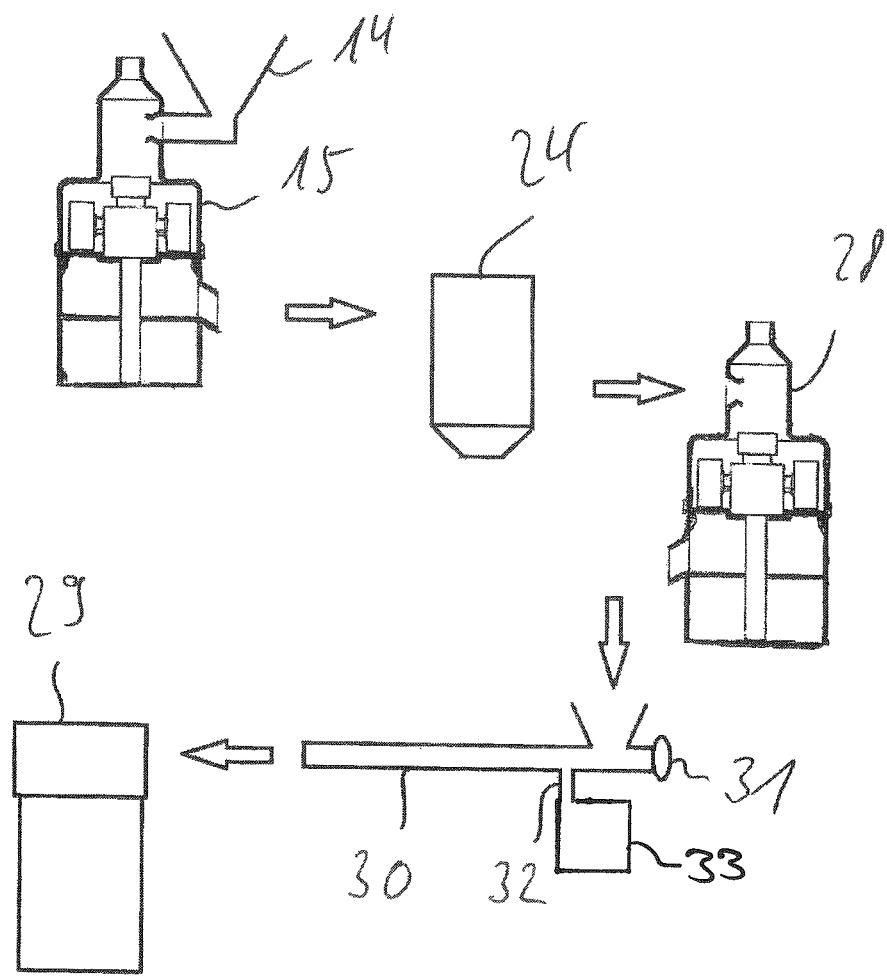
FIG. 3 shows an alternative embodiment of a system according to the invention.

In the alternative embodiment according to FIG. 3 the second pan mill 28 is arranged immediately downstream of the dryer 24. The biomass material is discharged from the second pan mill 28 in further comminuted form and is transported to the pellet press 29 with a pneumatic conveying means 30. A reactant supply 33 includes a reactant channel communicating with an orifice 32. In this embodiment, the reactant supply 33 is a source of ionized air, for example in the form of ozone. The pneumatic conveying means 30 comprises a blower 31 which generates an air flow of sufficient speed to entrain the constituents of the biomass material.

A substream of ionized air, for example in the form of ozone, is added to this airstream via an opening 32. The ozone acts as an oxidizing reactant upon the predominantly fibrous constituents of the biomass material. Since the predominantly fibrous constituents of the biomass material are small and the pneumatic conveying brings about intensive contact between the ozone and the predominantly fibrous constituents a treatment duration shorter than in the embodiment according to FIG. 1 is sufficient to achieve the desired effect. Taking place in the biomass material are oxidation reactions which are then no longer available to bring about heating in a later pellet heap.

The invention claimed is:

1. A system for producing biomass pellets comprising a pan mill (15, 28) for comminuting a biomass material, a treatment apparatus (25, 30) in which the comminuted biomass material is treated with an oxidizing reactant, the treatment apparatus comprising a reactant supply, a reactant channel extending from the reactant supply and defining an orifice, wherein the treatment apparatus delivers the reactant from the supply to the orifice so that the reactant exits from the orifice and treats the comminuted biomass material and a pellet press (29) for pressing pellets from the treated biomass material.

2. The system as claimed in claim 1, wherein the pan mill (15, 18) comprises a perforated die (20) in the form of a flat die.

3. The system as claimed in claim 1, wherein the treatment apparatus (25) comprises a spraying apparatus (26) for contacting the comminuted biomass material with the oxidizing reactant in liquid form.

4. The system as claimed in claim 1, wherein the oxidizing reactant is hydrogen peroxide.

5. The system as claimed in claim 1, wherein the treatment apparatus (30) comprises an opening (32) for contacting the biomass material with the oxidizing reactant in a gaseous state.

6. The system as claimed in claim 5, wherein the oxidizing reactant is ozone.

7. The system as claimed in claim 5, wherein the treatment apparatus (30) is configured as a pneumatic conveyor.

8. The system as claimed in claim 1, wherein upon comminution by the pan mill (15) the biomass material has a moisture content of at least 20% by weight.

9. The system as claimed in claim 1, wherein a dryer (24) is arranged between the pan mill (15) and the treatment apparatus (25, 30).

10. The system as claimed in claim 1, wherein an intermediate storage means (27) is arranged between the treatment apparatus (25) and the pellet press (29).

11. A process for producing biomass pellets comprising the steps of:
    comminuting biomass material with a pan mill (15, 28);
    treating the comminuted biomass material with an oxidizing reactant to produce a treated biomass material; and
    pressing the treated biomass material into pellets.

12. The process for producing biomass pellets of claim 11, comprising:
    storing the treated biomass material for a predetermined period of time before said step of pressing.

13. The process for producing biomass pellets of claim 11, comprising:
    drying the comminuted biomass material before said step of treating.

14. The process for producing biomass pellets of claim 11, wherein said step of treating comprises:
    spraying said comminuted biomass material with an oxidizing reactant in liquid form.

15. The process for producing biomass pellets of claim 14, wherein said oxidizing reactant in liquid form comprises hydrogen peroxide diluted with water.

16. The process for producing biomass pellets of claim 11, wherein said step of treating comprises:
    exposing said comminuted biomass material to an oxidizing reactant in gaseous form.

17. The process for producing biomass pellets of claim 16, wherein said oxidizing reactant is ozone.

* * * * *